(12) United States Patent
Talbott (10) Patent No.: US 11,450,234 B2
(45) Date of Patent: Sep. 20, 2022

(54) BINARY COUNTING DEVICE

(71) Applicant: Teresa A. Talbott, Santa Rosa, CA (US)

(72) Inventor: Teresa A. Talbott, Santa Rosa, CA (US)

( * ) Notice: Subject to any disclaimer, the term of this patent is extended or adjusted under 35 U.S.C. 154(b) by 669 days.

(21) Appl. No.: 16/279,866

(22) Filed: Feb. 19, 2019

(65) Prior Publication Data

US 2019/0266918 A1 Aug. 29, 2019

Related U.S. Application Data

(60) Provisional application No. 62/634,946, filed on Feb. 26, 2018.

(51) Int. Cl.
*G09B 23/02* (2006.01)
*G09B 19/02* (2006.01)

(52) U.S. Cl.
CPC ............. *G09B 23/02* (2013.01); *G09B 19/02* (2013.01)

(58) Field of Classification Search
CPC ................................ G09B 19/02; G09B 23/02
See application file for complete search history.

(56) References Cited

U.S. PATENT DOCUMENTS

| | | | | |
|---|---|---|---|---|
| 3,757,433 A * | 9/1973 | Robinson | ................. | G09B 1/28 434/172 |
| 4,790,757 A * | 12/1988 | Takahashi | .............. | G09B 19/02 434/209 |
| 6,884,077 B2 * | 4/2005 | Faulkner | ................ | G09B 19/02 434/188 |
| 2002/0109006 A1 * | 8/2002 | Evans | .................... | G09B 19/02 235/64 |
| 2004/0086836 A1 * | 5/2004 | Sundararajan | ......... | G09B 23/02 434/191 |
| 2013/0273513 A1 * | 10/2013 | Franklin | ................ | G09B 19/02 434/203 |

* cited by examiner

*Primary Examiner* — Eddy Saint-Vil
(74) *Attorney, Agent, or Firm* — Dentons Bingham Greenebaum LLP; Brian W. Chellgren (57) ABSTRACT

A device for teaching counting binary numbers (base 2) includes a frame having a plurality grooves with sliders deployed within said grooves. The device bears a plurality of zero indicia, each indicia aligned with one of the grooves. Extending from the slider is a label "1" which overlays the corresponding zero indicia when the slider is moved to a first end of the groove to indicate that its value is operative. Each of the sliders are labelled in binary progression (1, 2, 4, 8, 16, etc.). In use, the device can teach the 0's and 1's representation of a decimal base number by correlating the visible 0's and 1's on the device with the sum of the numbers displayed on the sliders. In addition to decimal numbers, the device may also be used to convert binary numbers into hexadecimal numbers and other base systems, and to convert binary numbers into text.

15 Claims, 9 Drawing Sheets

BINARY COUNTING DEVICE

This application claims the benefit of priority to U.S. provisional patent application Ser. No. 62/634,946, filed Feb. 26, 2018, for BINARY COUNTING DEVICE, incorporated herein by reference.

FIELD OF THE INVENTION

A device for teaching counting binary numbers (base 2) includes a frame having a plurality grooves with sliders deployed within said grooves. The device bears a plurality of zero indicia, each indicia aligned with one of the grooves. Extending from the slider is a label "1" which overlays the corresponding zero indicia when the slider is moved to a first end of the groove to indicate that its value is operative. Each of the sliders are labelled in binary progression (1, 2, 4, 8, 16, etc.). In use, the device can teach the 0's and 1's representation of a decimal base number by correlating the visible 0's and 1's on the device with the sum of the numbers displayed on the sliders. In addition to decimal numbers, the device may also be used to convert binary numbers into hexadecimal numbers and other base systems, and to convert binary numbers into text.

BACKGROUND OF THE INVENTION

The binary number system (base 2) is an alternative to the decimal number system (base 10) commonly used in everyday life. Computing devices rely on binary numbers and binary math to perform their calculations. Learning the binary number system is fundamental to understanding computer programming, storage of electronic data, Boolean logic, and other aspects of computer science. It was realized by the inventor that a need exists for a hands-on teaching tool to visually demonstrate the relationship between base 2 and base 10 numbers and aid users in learning the binary number system.

SUMMARY

The disclosed binary counting device addresses these needs and provides multiple benefits to a user. In some embodiments, the binary counting device includes a frame, a plurality of parallel grooves in the frame, each groove including a first end and an opposite second end, a plurality of sliders, each slider being slidably engaged to one of the grooves, a plurality of first indicia (e.g., "0" s) located on the frame, each of the plurality of first indicia being in proximity to the first end of one of the plurality of grooves, and a plurality of second indicia (e.g., "1" s), each located on a slider, wherein the second indicia overlays the first indicia when the slider is slid to the first end of the groove.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. A quantity described as "approximately" or "about" refers to a range of quantities within ±10% of the most precise significant digit in the stated quantity unless otherwise specified (e.g., "about 2" refers to 1.9 to 2.1, "about 2.1" refers to 2.09 to 2.11, and "about 2.15" refers to 2.149 to 2.151). Discussions pertaining to specific compositions of matter, if present, are presented as examples only and do not limit the applicability of other compositions of matter, especially other compositions of matter with similar properties, unless otherwise indicated.

Referring to FIGS. 1-6, a first embodiment of a binary counting device 10 includes a rear panel 12, a front panel 14, and a plurality of sliders 16. The rear panel 12 includes a front surface 18, a rear surface 20, and a top 22, bottom 24, and two opposing sides 26 extending between the front surface 18 and the rear surface 20. In the depicted embodiment, the rear panel 12 is rectangular in shape with a width of about 8.0 inches, a height of about 3.5 inches, and a depth of about 0.3 inches.

Figure 1A:
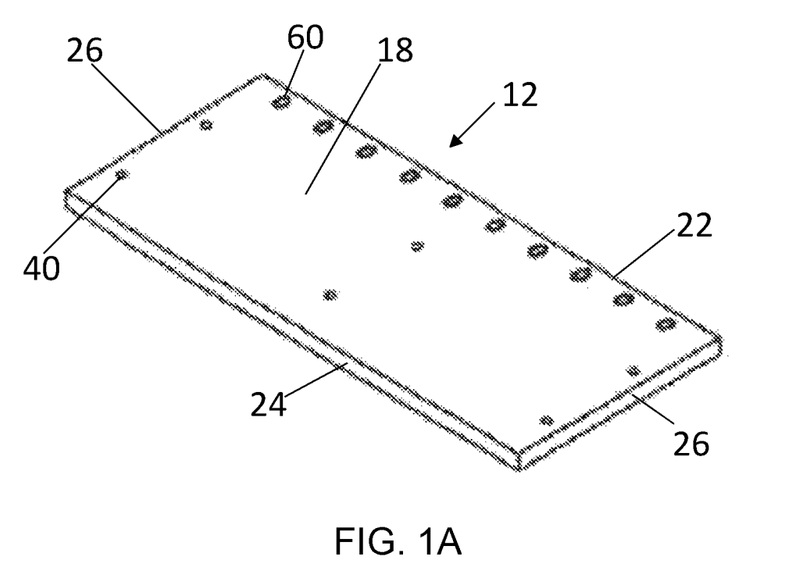
FIG. 1A depicts a front perspective view of a rear panel of a first embodiment of a binary counting device.
Figures 1B, 1C:
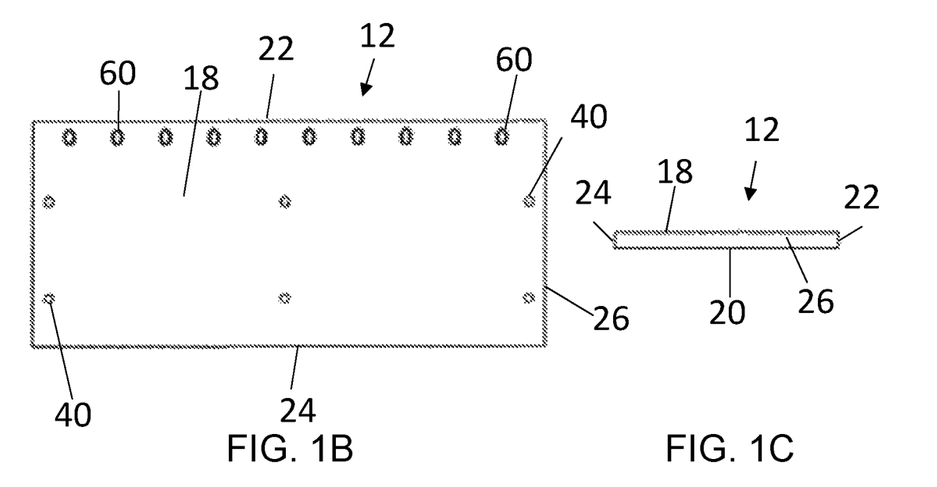
FIG. 1B depicts a front view of the rear panel in FIG. 1A.
FIG. 1C depicts a side view of the rear panel in FIG. 1A.
Figure 2A:
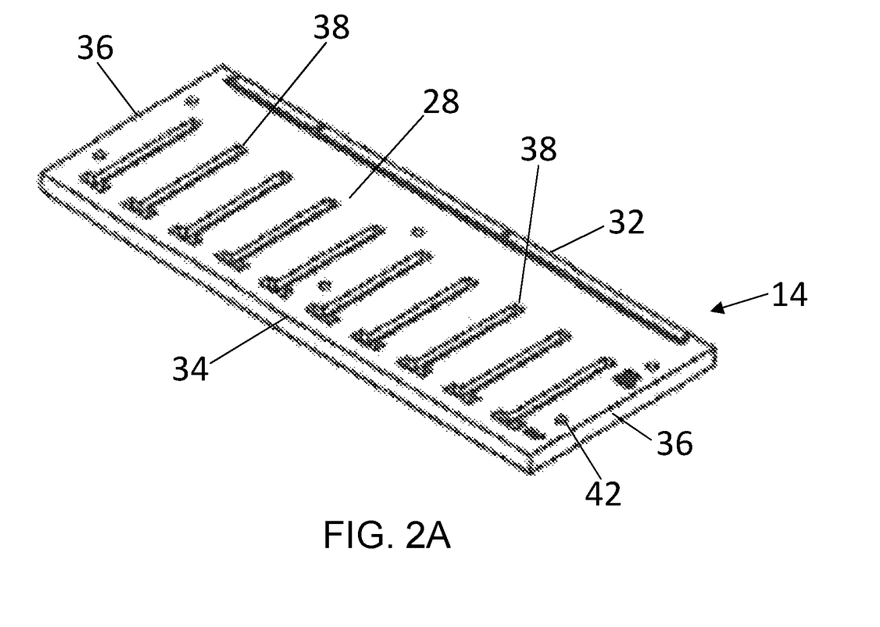
FIG. 2A depicts a front perspective view of a front panel of the first embodiment of a binary counting device.
Figures 2B, 2C:
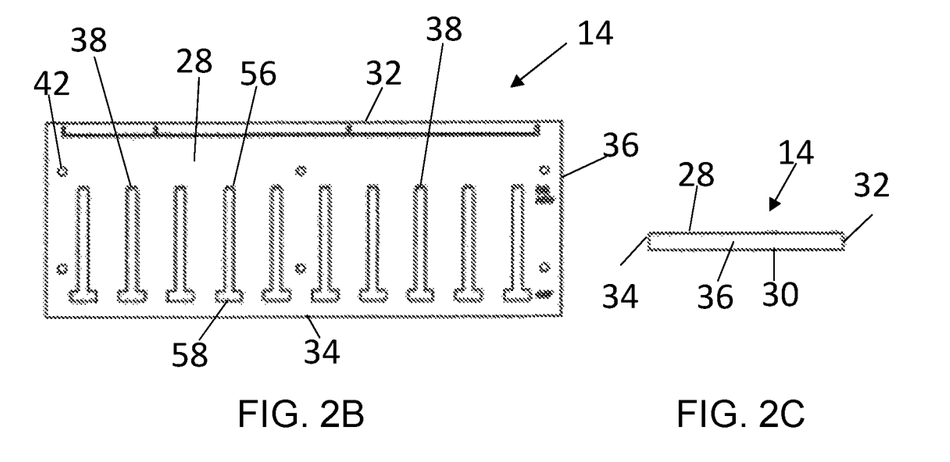
FIG. 2B depicts a front view of the front panel in FIG. 2A.
FIG. 2C depicts a side view of the front panel in FIG. 2A.

The front panel 14 includes a front surface 28, a rear surface 30, and a top 32, bottom 34, and two opposing sides 36 extending between the front surface 28 and the rear surface 30. In the depicted first embodiment, the front panel 14 is rectangular in shape with a width of about 8.0 inches, a height of about 3.0 inches, and a depth of about 0.3 inches. The front panel 14 further includes a plurality of elongated, parallel grooves 38. The front surface 28 includes ten grooves 38 in this first embodiment, but embodiments with additional or fewer grooves are contemplated. In particular, embodiments with eight grooves may be helpful to teach the concept of a byte. In the depicted first embodiment, each groove 38 is about 1.5 inches long and 0.125 inches wide.

The rear panel 12 includes at least one rear panel mounting hole 40 and the front panel 14 includes at least one front panel mounting hole 42. A fastener 44, such as a screw, may extend serially through the front panel mounting hole 40 and into the rear panel mounting hole 42 to secure the front surface 18 of the rear panel 12 to the rear surface 30 of the front panel 14. When attached together, at least one cavity 46 is formed between the front panel 14 and the rear panel 12. In other embodiments, the front panel 14 and rear panel 12 may be attached by clips, adhesives, snap-fit engagement or other means as known in the art. In further embodiments, the front and rear panels may be formed as a single piece by injection molding or other manufacturing technique.

Figure 3:
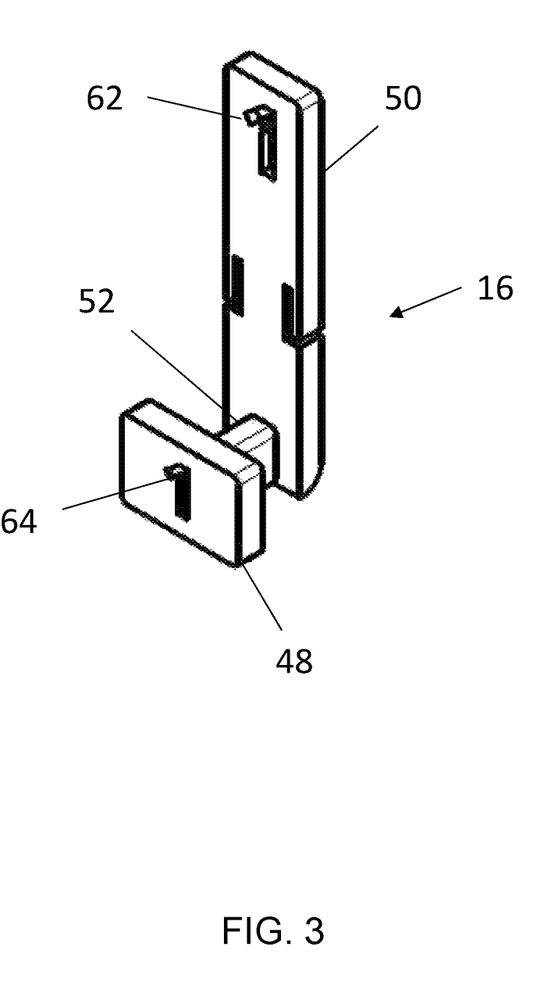
FIG. 3 depicts a slider of the first embodiment of a binary counting device.

An embodiment of a slider 16 is depicted in FIG. 3. In this embodiment, the slider 16 includes a rectangular or square-shaped external portion 48, an elongated rectangular internal portion 50, and a relatively thin attachment portion 52 extending between and connecting the external portion 48 and the internal portion 50. In the depicted embodiment, the length of the slider 16 is about 0.625 inches and the height is about 0.375 inches. The binary counting device 10 includes a plurality of sliders 16, each slidably engaged with one of the grooves 38. In use, a slider 16 is retained in each of the grooves 38 such that the attachment portion 52 extends substantially perpendicularly through the groove 38 with the external portion 48 external to the groove 38 and the internal portion 50 located within the cavity 46.

Figure 6:
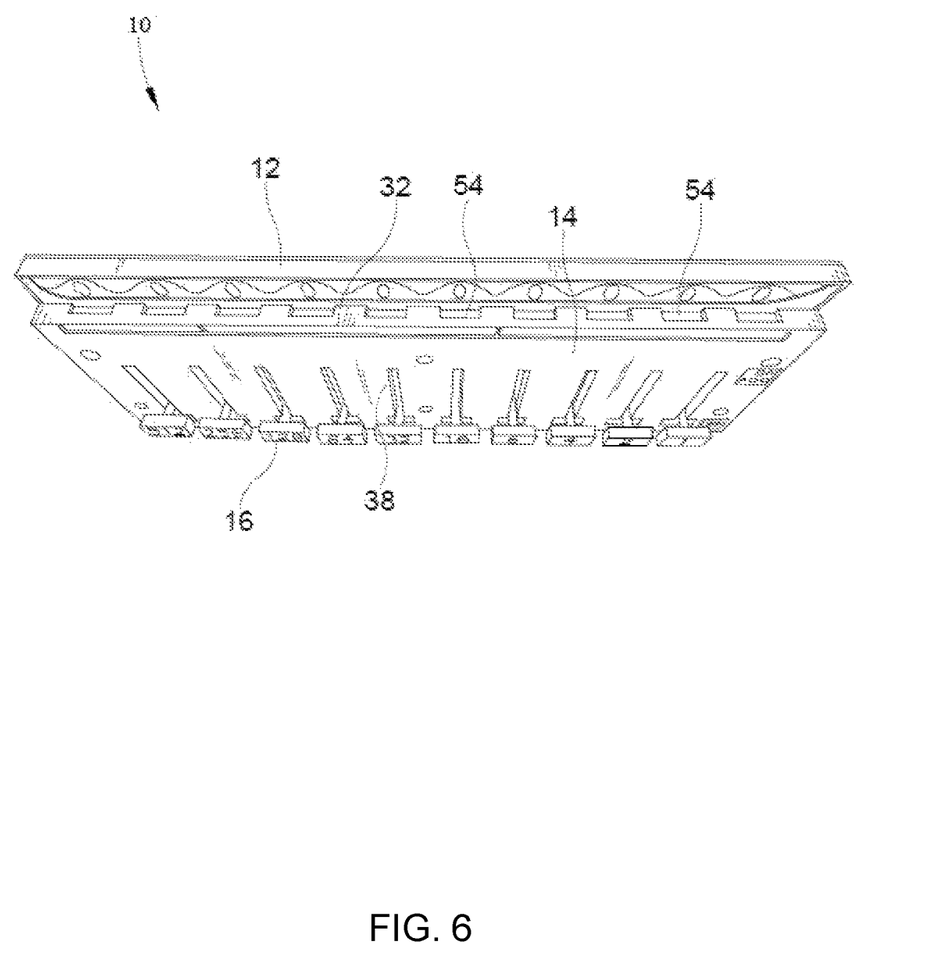
FIG. 6 is a top perspective view of the first embodiment of a binary counting device.

The top 32 of the front panel 14 includes at least one opening 54 in communication with the cavity 46, as most easily seen in FIG. 6. Each opening 54 is sized to pass a portion of the internal portion 50 of the slider 16. Each groove 38 includes a first end 56 and an opposite second end 58, such that the slider 16 engaging the groove 38 is moveable along the length of the groove 38 between the ends 56, 58. When a slider 16 is moved to the first end 56 of the groove 38, a portion of the internal portion 50 of the slider 16 extends out of the opening 54 and is visible to the user. When the slider 16 is moved away from the first end 56 in the direction of the second end 58, the internal portion 50 retracts into the cavity 46 and is substantially obscured from the user's view.

Preferably, each slider 16 is retained at its current location within the groove 38 by a friction fit or other means, and requires force to be applied by a user to move the slider. In some embodiments (not shown), the attachment portion of the slider increases in width as it extends from the external portion to the internal portion. In this embodiment, a user may press the slider into the device, causing the narrower portion of the attachment portion to be aligned with the groove, slide the slider along the groove to a desired location, then cease pressing, causing the slider to move outward and align the wider portion of the attachment portion with the groove, and retaining the slider at the desired location via a friction fit.

Figure 4:
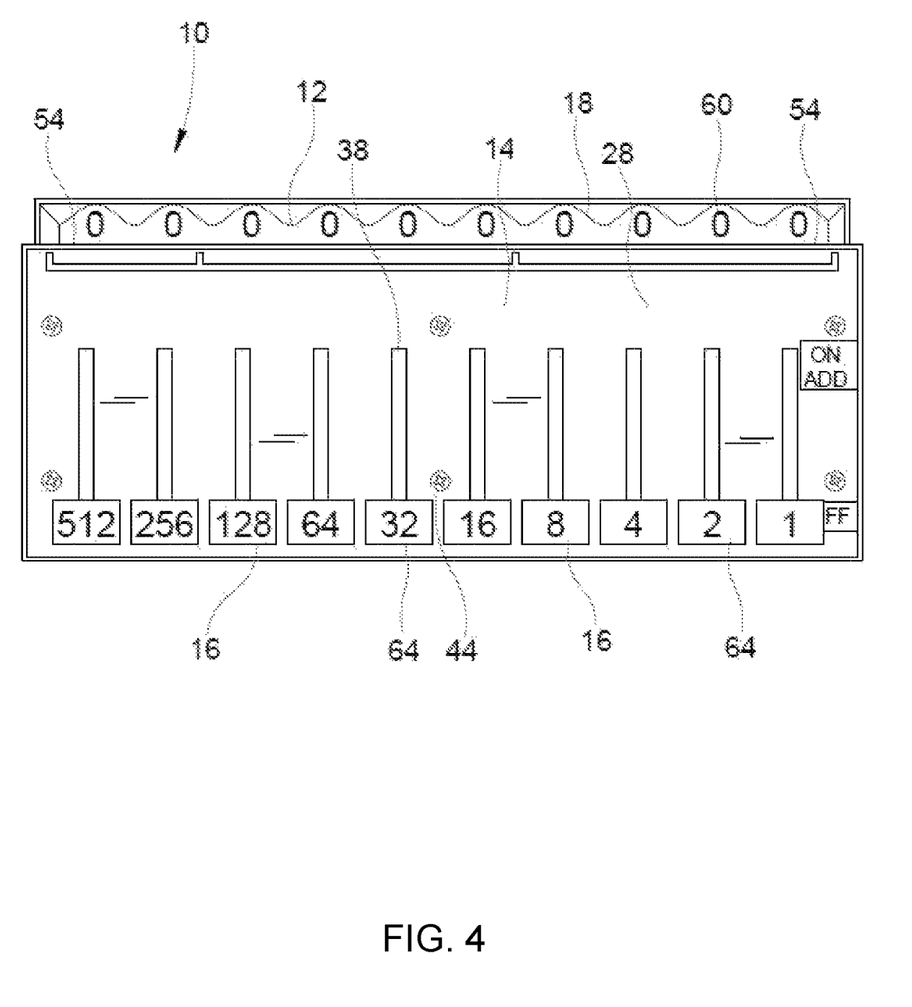
FIG. 4 is a front view of the first embodiment of a binary counting device.
Figure 5:
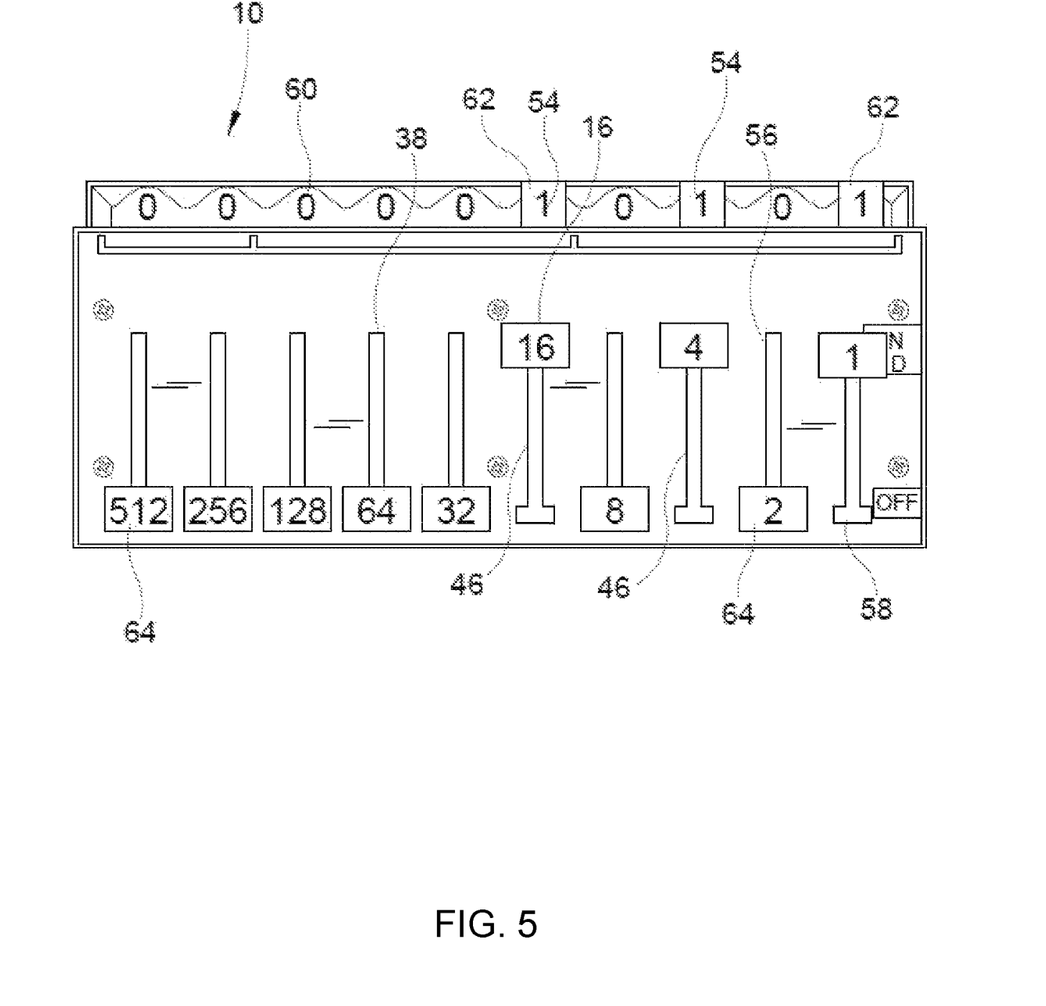
FIG. 5 is another front view of the first embodiment of a binary counting device.

The binary counting device 10 includes first indicia 60, second indicia 62, and third indicia 64 to facilitate conversion of decimal numbers to binary numbers and vice versa. The first indicia 60 are located on the front surface of the rear panel, each of the first indicia 60 in alignment with the first end 56 of one of the plurality of grooves 38. The first indicia 60 are "zero", "0", or corresponding characters in other languages. The second indicia 62 are "one", "1", or corresponding characters in other languages. These second indicia 62 are located on the internal portion 50 of each slider. When sliders 16 are located at the second end 58 of each groove 38, as shown in FIG. 4, the internal portions 50 of the sliders 16 are substantially obscured and the second indicia 62 are not easily visible. When at least one slider 16 is moved to the first end 56 of a groove 38, as shown in FIG. 5, the portion of the internal portion 50 bearing the second indicia 62 overlays the first indicia 60. The third indicia 64 are ordinal numbers in a binary progression series (i.e., 1, 2, 4, 8, 16, 32, etc.). A third indicia 64 is located on the external portion 48 of each slider 16 in increasing sequential order.

Figure 7:
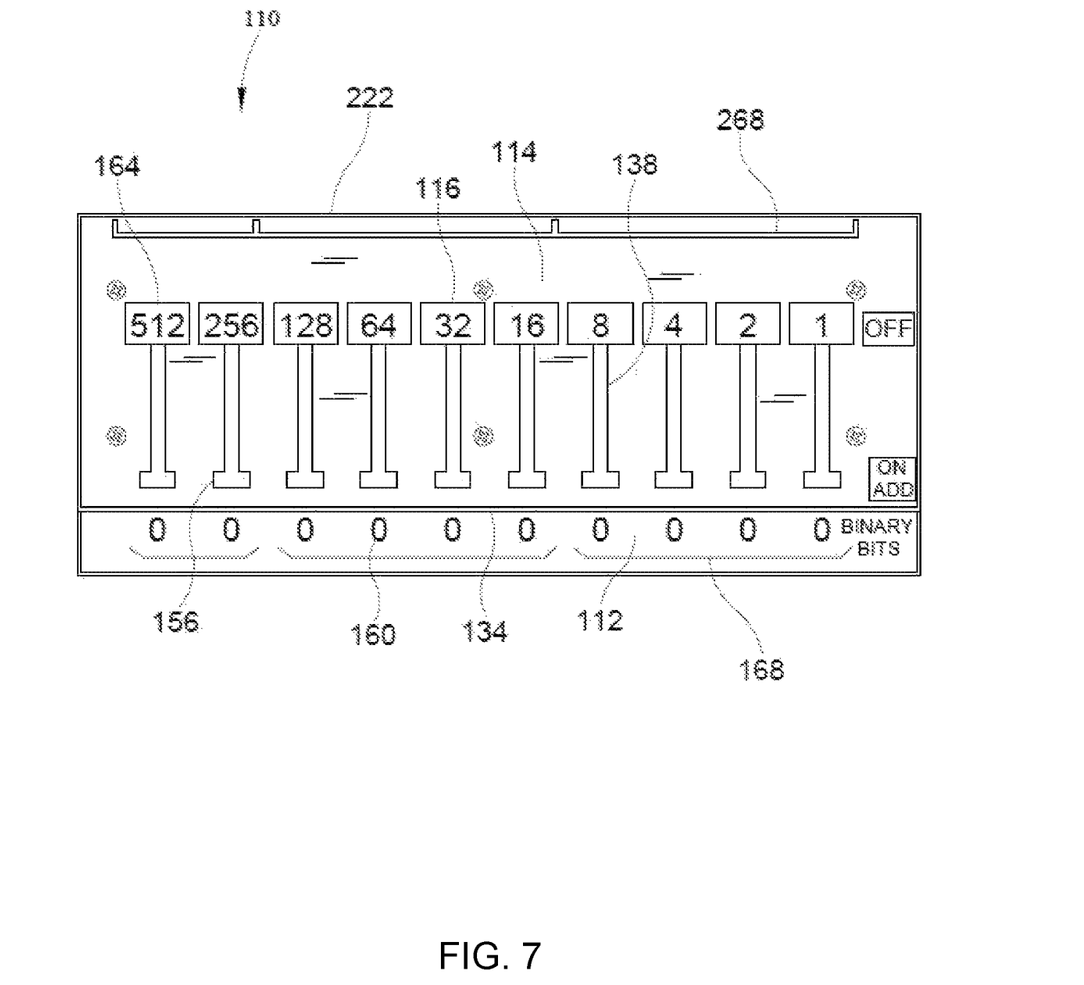
FIG. 7 is a front view of a second embodiment of a binary counting device.
Figure 8:
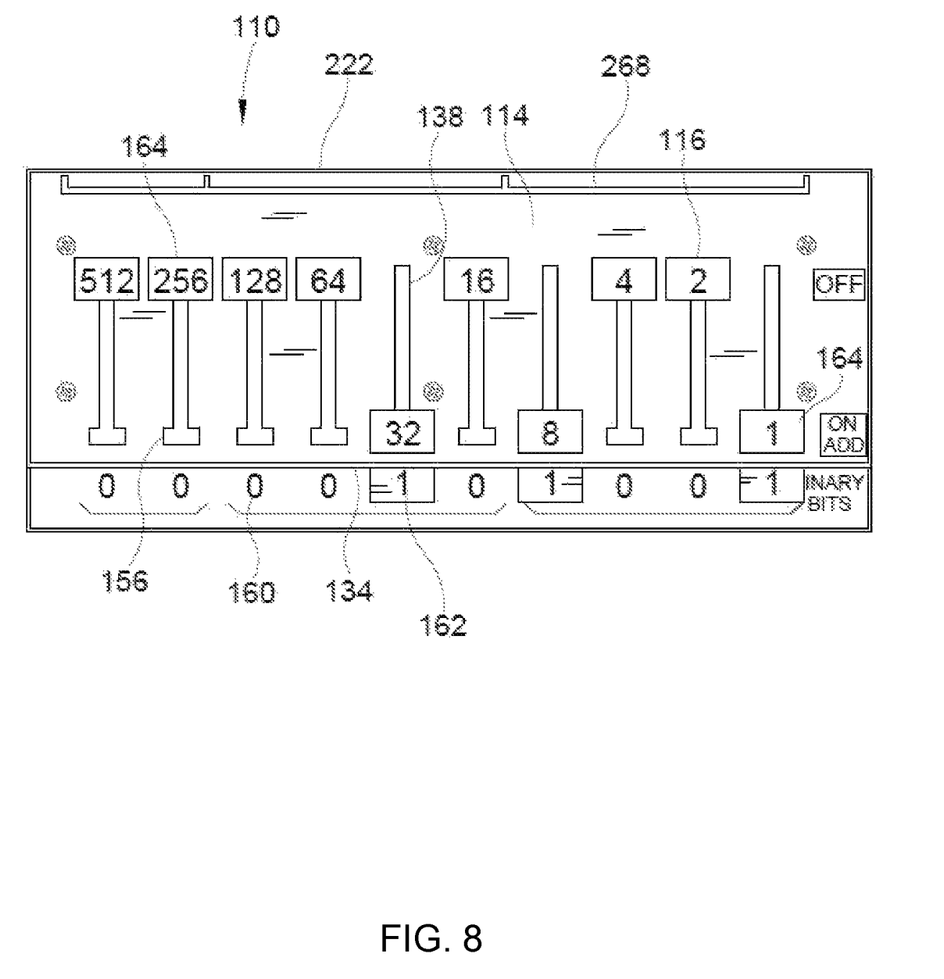
FIG. 8 is another front view of the second embodiment of a binary counting device.

Referring now to FIGS. 7 and 8, a second embodiment of a binary counting device 110 is displayed. This second embodiment 110 is generally similar to the first embodiment 10, but with several differences. In the first embodiment 10, the first end 56 of the groove 38 is the near the top 32 of the front panel 114. In this second embodiment 110, the first end 156 is near the bottom 134 of the front panel 114, such that slider 116 is moved toward the bottom 134 of the front panel 114 to indicate the value on the slider 116 is operative (i.e., the second indicia 162 "1" on the slider 116 overlays the first indicia 160 "0" near the first 156 end of the groove 138).

Figure 9:
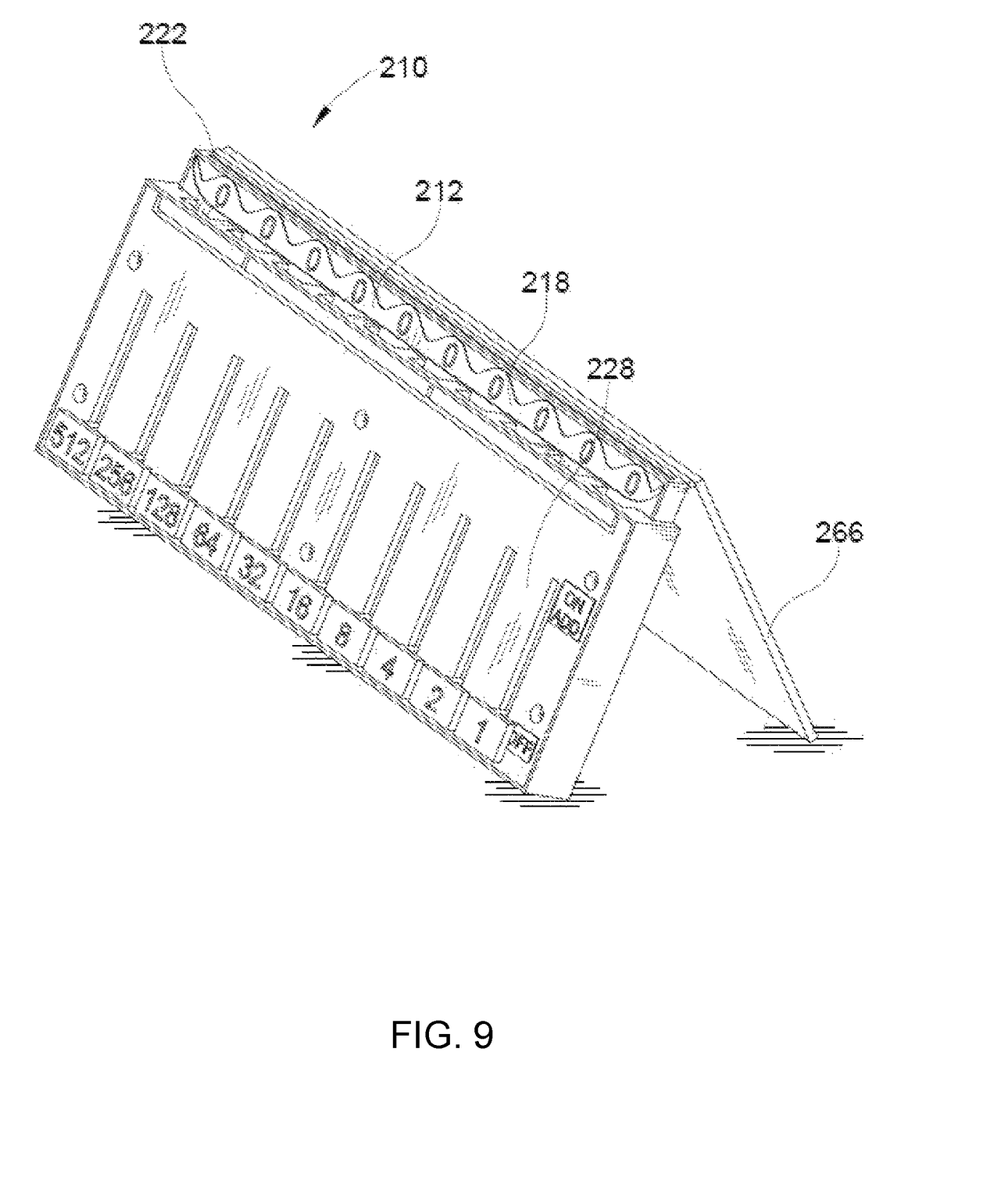
FIG. 9 is a side perspective view of a third embodiment of a binary counting device.

Referring now to FIG. 9, a third embodiment of a binary counting device 210 is displayed. This third embodiment 210 is similar to the first embodiment 10, but further includes a cover 266 attached at the top 222 of the rear panel 212 of the device 210. The cover 266 is rotatable about the top 222 from a first position (not shown) in which the cover 266 overlays the front surfaces 218, 226, to a second position shown in FIG. 9, in which the cover 266 extends downward and behind the device 210 to function as a stand. In other embodiment (not shown), a cover may be attached to and rotatable about the bottom of the rear panel, or may be attached to the bottom of the front panel. In other embodiments, other forms of covers or stands commonly known in the art may be attached to or incorporated into the binary counting device. In certain embodiments, the binary counting device 210 may include a slot 268 in the top 222 or elsewhere on the device 210. The slot 268 is configured to removably receive informational cards (not shown) which explain conversion of decimal numbers or binary numbers to hexadecimal numbers, and display an ASCII table associating hexadecimal numbers with ASCII characters. In this manner, the device 210 may be used to convert binary numbers into letters/text. In other embodiments, informational cards may display direct conversion of binary and/or decimal numbers into letters (e.g., decimal 1=binary 00001=A, the $1^{st}$ letter; decimal 20=binary 10100=T, the $20^{th}$ letter). Informational cards may also display information regarding conversion of decimal numbers into binary numbers, octal numbers, hexadecimal numbers, or other numbering formats, or may provide other relevant information.

The disclosed binary counting device may be used to convert a decimal number to a binary number. Using FIGS. 4 and 5 as an example, initially, as shown in FIG. 4, none of the sliders 16 are positioned at the first end 56 of the grooves 38 and all of the first indicia 64 are visible. The user selects a decimal number such as, for example, "21". The user then moves sliders 16 to the first ends 56 of the grooves 38 such that the summation of the third indicia 64 of the moved sliders 16 equals the selected decimal number. As shown in FIG. 5, the sliders 16 labeled with third indicia "16", "4" and "1" have been moved to the first end 56 of their respective grooves 38. Upon moving the sliders 16, the second indicia 62 "1"s on the moved sliders 16 overlay the first indicia 60 "0"s displayed on the rear panel 12. The entirety of the visible first indicia 60 and second indicia 62 display the binary number "10101" (ignoring the leading zeros) which is equal to the decimal number "21".

FIGS. 7 and 8 provide another example of using the disclosed binary counting device 110 to convert a decimal number to a binary number. Initially, as shown in FIG. 7 none of the sliders 116 are positioned at the first end 156 of the grooves 138 and all of the first indicia 160 are visible. The user selects a decimal number such as, for example, "41". The user then moves sliders 116 to the first end 156 of the grooves 138 such that the summation of the third indicia 164 of the moved sliders 116 equals the selected decimal number. As shown in FIG. 8, the sliders 116 labeled "32", "8" and "1" have been moved to the first end 156 of their respective grooves 138. Upon moving the sliders 116, the "1"s on the moved sliders 116 overlay the "0"s displayed on the rear panel 112. The entirety of the visible first indicia 160 and second indicia 162 display the binary number "101001" (ignoring the leading zeros) which is equal to the decimal number "41".

The disclosed binary counting device may also be used to convert a binary number to a decimal number. Initially, as shown in FIG. 4, none of the sliders 16 are positioned at the first end 56 of the grooves 38 and all of the first indicia 60 are visible. The user selects a binary number such as, for example, "10101". The user then moves sliders 16 to the first ends 56 of the grooves 38 as shown in FIG. 5 such that the entirety of the visible first indicia 60 and second indicia 62 display the selected binary number. The summation of the third indicia 64 on the moved sliders (16+4+1=21) is the decimal number equal to the selected binary number.

The disclosed binary counting device may also be used to convert binary numbers and decimal numbers into hexadecimal numbers (base 16). The front surface 28 of the front panel 14 includes sorting indicia 68 used to divide grooves 38 and their respective first, second and third indicia 60, 62, 64 into groups of four, starting with the smallest digit. Using FIG. 5 as an example, the displayed binary number "10101" is divided into two groups of four digits each, adding leading zeros, to "0001" and "0101." Each digit is assigned its respective power of two (e.g., 1, 2, 4, or 8), and added together, such that "0101" is equal to 8*0+4*1+2*0+1*1=5 and "0001" is equal to 8*0+4*0+2*0+1*1=1. Numbers greater than 9 are represented as letters, as 10=A, 11=B, 12=C, 13=D, 14=E and 15=F. As such, "10101" in binary is equal to "15" in hexadecimal and, and described above, is also equal to "21" in decimal numbers.

FIG. 8 provides another example of using the binary counting device to convert a binary number into a hexadecimal number. In the depicted second embodiment 110, the front surface 118 of the rear panel 112 includes sorting indicia 168 used to divide first, second and third indicia 160, 162, 164 into groups of four, starting with the smallest digit. The displayed binary number "101001" is divided into two groups of four digits each, adding leading zeros, to "0010" and "1001." Each digit is assigned its respective power of two (e.g., 1, 2, 4, or 8), and added together, such that "1001" is equal to 81+4*0+2*0+1*1=9 and "0010" is equal to 8*0+4*0+21+1*0=2. As such, "101001" in binary is equal to "29" in hexadecimal.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only.

What is claimed is:

1. A device comprising,
   a frame including a front panel and a rear panel, the front panel and the rear panel being attached together and defining a cavity between the front panel and the rear panel, and at least one opening in communication with the cavity;
   a plurality of groove-slider combinations, each of the plurality of groove-slider combinations including
      a groove in the front panel, the groove including a first end and an opposite second end,
      a slider being moveably engaged to the groove, the slider including an external portion external to the cavity, an internal portion at least partially within the cavity, and an attachment portion extending through the groove between the external portion and the internal portion,
      a first indicia located on the frame in proximity to the first end of the groove,
      a second indicia located on the internal portion of the slider, and
      a third indicia located on the external portion of the slider,
   wherein the second indicia overlays the first indicia when the slider is moved to the first end of the groove; and
   wherein the third indicia of each of the plurality of groove-slider combinations are non-identical.

2. The device of claim 1, wherein the first indicia is "zero" or "0".

3. The device of claim 1, wherein the second indicia is "one" or "1".

4. The device of claim 1, wherein the third indicia is an ordinal number in a binary progression series.

5. The device of claim 1, wherein the frame includes an extendable stand.

6. The device of claim 1, wherein the front panel includes a front surface, an opposite rear surface, and a top, a bottom, and at least one side extending between the front surface and the rear surface.

7. The device of claim 6, wherein the at least one opening is formed in the top of the front panel or the bottom of the front panel.

8. The device of claim 6, wherein the groove is formed in the front surface and rear surface of the front panel and does not extend to the top, bottom, or at least one side.

9. The device of claim 1, wherein a portion of the internal portion of the slider extends through the opening when the slider is moved to the first end of the groove.

10. The device of claim 9, wherein the second indicia is located on the portion of the internal portion of the slider that extends through the opening when the slider is moved to the first end of the groove.

11. The device of claim 1, wherein the rear panel includes a front surface, an opposite rear surface, and a top, a bottom, and at least one side extending between the front surface and the rear surface.

12. A method of converting a decimal number to a binary number, comprising:
    providing a device according to claim 1;
    selecting a decimal number; and
    moving, in at least one of the plurality of groove-slider combinations, the slider to the first end of the groove such that summation of the third indicia on the moved slider in the at least one of the plurality of groove-slider combinations equals the selected decimal number;
    wherein the second indicia on the moved slider in the at least one of the plurality of groove-slider combinations and the first indicia not overlaid by the second indicia on the moved slider in the at least one of the plurality of groove-slider combinations represent a binary number equal to the selected decimal number.

13. A method of converting a binary number to a decimal number, comprising:
    providing a device according to claim 1;
    selecting a binary number; and
    moving, in at least one of the plurality of groove-slider combinations, the slider to the first end of the groove such that the second indicia on the moved slider in the at least one of the plurality of groove-slider combinations and the first indicia not overlaid by the second indicia in the at least one of the plurality of groove-slider combinations represent the selected binary number;
    wherein summation of the third indicia on the moved slider in the at least one of the plurality of groove-slider combinations equals a decimal number equal to the selected binary number.

14. The device of claim 1, wherein the groove of any one of the plurality of groove-slider combinations is parallel to the groove of any of the plurality of groove-slider combinations.

15. The device of claim 1, wherein the attachment portion of the slider increases in width as the attachment portion extends from the external portion to the internal portion.

* * * * *